(12) United States Patent
Korn et al.

(10) Patent No.: US 12,719,067 B2
(45) Date of Patent: Aug. 25, 2026

(54) HUMIDIFYING DEVICE HAVING CHANNEL PLATES AND CHANNEL PLATE FOR HUMIDIFYING DEVICE

(71) Applicant: MANN+HUMMEL GmbH, Ludwigsburg (DE)

(72) Inventors: Alexander Korn, Güglingen (DE); Steffen Schuetz, Bietigheim-Bissingen (DE); Pius Trautmann, Stuttgart (DE); Ralph Kemper, Ludwigsburg (DE); Tom Zeltwanger, Stuttgart (DE); Markus Wagner, Arnstorf (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 408 days.

(21) Appl. No.: 18/411,010

(22) Filed: Jan. 11, 2024

(65) Prior Publication Data

US 2024/0145741 A1 May 2, 2024

Related U.S. Application Data

(63) Continuation of application No. PCT/EP2022/071194, filed on Jul. 28, 2022.

(30) Foreign Application Priority Data

Jul. 30, 2021 (DE) ......................... 102021119823.2

(51) Int. Cl.
*H01M 8/04119* (2016.01)

(52) U.S. Cl.
CPC ............................... *H01M 8/04149* (2013.01)

(58) Field of Classification Search
CPC ............. B01D 63/085; F28D 21/0015; H01M 8/04149

(Continued)

(56) References Cited

U.S. PATENT DOCUMENTS 11,069,908 B2 7/2021 Buntz et al.
2010/0019400 A1 1/2010 Robb et al.

(Continued)

FOREIGN PATENT DOCUMENTS

DE 102014018142 A1 6/2016
DE 102016224478 A1 6/2018

(Continued)

OTHER PUBLICATIONS

English Machine Translation of DE 102019000150 A1 (Year: 2020).*

(Continued)

*Primary Examiner* — Charles S Bushey

(57) ABSTRACT

A humidifying device has a plate stack with channel plates stacked in stacking direction in the plate stack. The channel plates have a longitudinal axis perpendicular to the stacking direction. One or more channel plates have a first and a second channel partial plate arranged on each other in stacking direction, and each provided with a circumferentially extending frame and stays arranged between oppositely positioned sides of the frame. The stays are slanted to the longitudinal axis. The stays of the first and second channel partial plates cross each other, viewed in the stacking direction. Semipermeable layers separate a first group of flow channels and a second group of flow channels from each other in the plate stack. Flow channels of the first group alternate with flow channels of the second group in the stacking direction. The first or second group of flow channels extends along the longitudinal axis.

20 Claims, 11 Drawing Sheets

(58) Field of Classification Search
USPC .......................................................... 261/104
See application file for complete search history.

(56) References Cited

U.S. PATENT DOCUMENTS

2012/0181712 A1 7/2012 Vanderwees et al.
2019/0046928 A1 2/2019 Van Engelen
2019/0081335 A1 3/2019 Shinozaki
2020/0161678 A1 5/2020 Bauer et al.
2024/0145740 A1* 5/2024 Korn .................... B01D 63/085
2024/0186542 A1* 6/2024 Korn .................... B01D 63/085
2024/0282988 A1* 8/2024 Voca ................. H01M 8/04149
2024/0291001 A1* 8/2024 Jainek .................... B01D 65/08
2025/0062370 A1* 2/2025 Dietrich .............. H01M 8/0258

FOREIGN PATENT DOCUMENTS

DE 102019000150 A1 * 7/2020
DE 102019123534 A1 3/2021

OTHER PUBLICATIONS

International Search Report in corresponding International Appln. No. PCT/EP2022/071194, Dec. 5, 2022, 2 pages, Rijswijk, Netherlands.

* cited by examiner

HUMIDIFYING DEVICE HAVING CHANNEL PLATES AND CHANNEL PLATE FOR HUMIDIFYING DEVICE

CROSS-REFERENCE TO RELATED APPLICATIONS

This application is a continuation application of International Application No. PCT/EP2022/071194 filed on Jul. 28, 2022, which claims the benefit of German Application No. 102021119823.2 filed on Jul. 30, 2021, the entire disclosures of which are incorporated herein by reference for all purposes.

BACKGROUND

The invention concerns a humidifying device, in particular for a fuel cell system, with a plurality of channel plates as well as a channel partial plate and a channel plate for a humidifying device.

DE 10 2016 224 478 A1 discloses a membrane humidifier for fuel cell systems in which moist exhaust gas from the fuel cell is used for humidifying reaction gases in the fuel cells. The membrane humidifier comprises a plurality of flow plates stacked on each other. Between two immediately neighboring or adjacently arranged flow plates, a moisture-permeable membrane is arranged, respectively.

SUMMARY

It is an object of the invention to provide an improved humidifying device, in particular for a fuel cell system.

A further object is providing an improved channel partial plate for such a humidifying device.

A further object is providing an improved channel plate for such a humidifying device.

The aforementioned object is solved according to an aspect of the invention by a humidifying device, in particular for a fuel cell system, with a plurality of channel plates sequentially following each other in a stacking direction in a plate stack, wherein at least one channel plate comprises two channel partial plates, arranged on each other in stacking direction, with a circumferentially extending frame, wherein stays extending at a slant to a longitudinal axis of the channel plate are arranged between two oppositely positioned sides of the respective frame, wherein in the plate stack at least two groups of flow channels are formed which are separated by semipermeable layers, in particular moisture-permeable layers; wherein, sequentially following each other in stacking direction, a flow channel of one group alternates with a flow channel of the other group, wherein one of the groups of flow channels extends along the longitudinal axis positioned perpendicularly to the stacking direction, and wherein the stays of the channel partial plates cross each other, viewed in stacking direction.

The further object is solved according to a further aspect of the invention by a channel partial plate designed for a humidifying device, in particular for a fuel cell system, comprising a circumferentially extending frame, wherein stays extending at a slant to a longitudinal axis are arranged between two oppositely positioned sides of the frame.

The further object is solved according to a further aspect of the invention by a channel plate designed for a humidifying device, in particular for a fuel cell system, with two channel partial plates, arranged on each other in a stacking direction, with a circumferentially extending frame, wherein stays extending at a slant to a longitudinal axis are arranged between two oppositely positioned sides of the respective frame, wherein the stays of the channel partial plates cross each other, viewed in stacking direction.

Beneficial embodiments and advantages of the invention result from the additional claims, the description, and the drawing.

According to an aspect of the invention, a humidifying device, in particular for a fuel cell system, is proposed, comprising a plurality of channel plates sequentially following each other in a stacking direction in a plate stack, wherein at least one channel plate comprises two channel partial plates, arranged on each other in a stacking direction, with a circumferentially extending frame. In this context, stays extending at a slant to a longitudinal axis of the channel plate are arranged between two oppositely positioned sides of the respective frame. In the plate stack, at least two groups of flow channels are formed which are separated by semipermeable layers, in particular moisture-permeable layers, wherein, sequentially following each other in stacking direction, a flow channel of one group alternates with a flow channel of the other group, wherein one of the groups of flow channels extends along the longitudinal axis which is positioned perpendicularly to the stacking direction. In this context, the stays of the channel partial plates cross each other, viewed in stacking direction.

Beneficially, moist or water-rich fluid, for example, exhaust gas of fuel cells, can flow in one group of flow channels while dry fluid as fresh gas, for example, air, can flow in the other group of flow channels. Via the semipermeable layer, the dry fluid can be humidified by the other fluid flowing in the neighboring flow channel.

Preferably, the flow channels are formed within the channel plates and between the channel plates.

For example, the proposed humidifying device can be an advantageous embodiment of a flat membrane humidifier. In this context, in particular the flow channel for the exhaust gas of the fuel cell system is formed of two channel partial plates. The embodiment of the channel partial plates is designed such that stays extending at a slant are arranged in the flow region. Due to the mirrored or 180°-rotated installation of the channel partial plates, the stays meet each other and thereby cross each other. The thus produced crossed rib structure in two planes leads to an undulate flow movement in the flow channel. The stays can guide the respective fluid toward the semipermeable layer and in this way improve, for example, a moisture transfer between the two groups of flow channels. Due to this targeted influencing of the flow, an improved mass transfer, in particular moisture transfer, can be achieved and in this way the efficiency of the humidifying device can be increased.

Advantageously, three channel partial plates stacked on each other enclose two flow channels.

Beneficially, the stays can be embodied as one piece together with a channel partial plate and can be produced in a common manufacturing process, for example, by the method of injection molding. Due to the stays integrated into the channel partial plates, a simplified structure can be achieved. In particular, a crossed rib structure can be achieved by simply placing the channel partial plates on each other.

The stays can advantageously be arranged equidistantly relative to each other. However, angle, distance, and width of the stays can definitely vary. A cross section of the stays can be embodied, for example, rectangular, rectangular with rounded edges, or round. Advantageously, for example, rectangular stays of channel partial plates stacked on each other can support each other mutually in order to bear in this way a pressure of the semipermeable layer weighing on them. The stays can alternatively or additionally also comprise other cross sections at least in sections, for example, L-shaped or U-shaped cross sections, in which angled legs project into the adjoining flow channel and there reinforce turbulences in the flow channel which are advantageous for mass transfer.

In an alternative embodiment, also the flow channel for the fresh gas, in particular the supply air of the fuel cell system, can be provided with stays for influencing flow.

Advantageously, in contrast to the prior art in which each group of flow channels is arranged in its own channel plate, only half the number of plates is required in the proposed humidifying device because the two groups of flow channels are formed in or at a channel partial plate. Correspondingly, the humidifying device exhibits a reduced flow resistance. Also, fewer joining locations are required for the channel partial plates in the plate stack. Each channel partial plate with semipermeable layer can be tested individually in the production which, as a whole, leads to a reduced reject risk of channel partial plates because defective channel partial plates can be recognized and rejected prior to joining to a plate stack.

The stacking direction of the channel plates can be straight so that the plate stack of channel plates is of a cuboid configuration in which the two inflow regions for fresh gas and exhaust gas are formed as two lateral faces of the cuboid which are perpendicular to each other. The stacking direction in principle can however also be in the form of a circle or arc so that, for example, a hollow cylinder results as an arrangement of the channel plates in which an inflow region is embodied as a wall of the hollow cylinder and another inflow region as an end face of the hollow cylinder.

Beneficially, the semipermeable layer, for example, embodied as a membrane, can be formed of a microporous material. The micropores in the material permit a moisture transport through the semipermeable layer. Advantageously, the moisture transport can be realized by means of capillary action in the microporous material. In particular, the semipermeable layer can be formed of PFSA. PFSA is a plastic material of perfluorosulfonic acid and inter alia is known by the trade name NAFION. The semipermeable layer can comprise at both sides porous layers, in particular nonwoven layers, for protection and for mechanical stabilization.

According to a beneficial embodiment of the humidifying device, the at least one channel plate can comprise two identical channel partial plates which are arranged rotated by 180° along the longitudinal axis so as to rest on each other. Due to the 180°-rotated arrangement of the channel partial plates along the longitudinal axis, the inner sides with the stays are arranged in the channel plate so as to immediately rest on each other. In this way, advantageously a crossed rib structure of the channel plate results which, for a flow guiding action of the exhaust gas, for example, is advantageous in relation to swirling of the exhaust gas and thus for the transfer of the moisture of the exhaust gas to the dry fresh gas, in particular supply air. It is particularly advantageous that such an arrangement can be achieved with identical channel partial plates so that for the production of the channel plates only one tool for manufacturing one channel partial plate is necessary.

According to a beneficial embodiment of the humidifying device, the channel partial plates can comprise at least two regions in a plate plane, in which the stays are arranged mirror-symmetrically to each other. In this manner, the manufacture of the channel partial plates can be designed in an advantageous manner, in particular by injection molding of plastic material.

According to a beneficial embodiment of the humidifying device, a first type of channel plates can be closed at both sides by a respective semipermeable layer which forms respectively an outer side of the respective channel partial plate. In this context, the stays in the interior of the respective channel partial plate can be arranged between the semipermeable layers. In this way, the flow behavior of an exhaust gas flow guided in the interior of the channel plate can be advantageously influenced in that, due to the crossed rib structure by means of the stays, swirling of the exhaust gas flow by generating turbulences, in particular by frequent directional changes of the flow, can be effected.

According to a beneficial embodiment of the humidifying device, the stays can comprise at least in sections an L-shaped or U-shaped cross section. In case of an L-shaped cross section, the respective stay comprises an angled leg which projects into the adjoining flow channel for the exhaust gas. Beginning at a back of the stay, the leg can be angled in a beneficial angle range between 20° and 120° in relation to the back of the stay. Angles about 90° are beneficial, a concrete angle can however be selected arbitrarily by a person of skill in the art.

In case of a U-shaped cross section, the stay comprises two angled legs which are oppositely positioned at the stay and project into the adjoining flow channel. Beginning at a back of the stay, the legs can be angled in a beneficial angle range between 20° and 120° in relation to the back of the stay. Angles about 90° are beneficial, a concrete angle can however be selected arbitrarily by a person of skill in the art.

Advantageously, by means of the stays, a flow grid at the exhaust gas side can be formed out of the channel partial plate itself by means of forming L-shaped cross sections and/or U-shaped cross sections. At the fresh gas side, optionally a separate flow grid can be inserted at the semipermeable membranes which delimit the flow channel for fresh gas at both sides. Due to this targeted influencing of the flow, an improved mass transfer, in particular moisture transfer from the exhaust gas flow to the fresh gas flow, can be achieved. In this way, the efficiency of the humidifying device can be increased. Due to the shape of the L-shaped and the U-shaped cross sections, in particular their height, angle between legs and back of the stay, distances between different types of cross sections along a stay and the like, the mass transfer and the pressure loss can be influenced in a targeted manner. The L-shaped cross section or U-shaped cross section at the exhaust gas side can serve additionally as a spacer and prevents collapse of the flow channel due to a possibly existing differential pressure.

According to a beneficial embodiment of the humidifying device, at least one of the stays of one of the channel partial plates can comprise at least in sections thereof an L-shaped and at least in sections thereof a U-shaped cross section. When combining L-shaped and U-shaped cross sections along a stay, the U and L cross sections along the course of the respective stay can alternate, in particular at equidistant spacings. The U-shaped cross sections permit in this context an improved support in relation to the rib structure or the stays of a neighboring channel partial plate while the L-shaped cross sections enable an advantageous flow mixing and/or turbulence generation transverse to the flow direction.

According to a beneficial embodiment of the humidifying device, the channel partial plates can comprise at least one fresh gas plate and at least one exhaust gas plate whose stays are differently designed in cross section at least in sections thereof. In particular, the at least one fresh gas plate can comprise stays with, at least in sections, L-shaped cross section in which an angled leg of the respective stay projects into the adjoining flow channel. As an alternative or in addition, the at least one exhaust gas plate can comprise stays with, at least in sections, U-shaped cross section in which two angled legs oppositely positioned at the stay project into the adjoining flow channel. Advantageously, an improved mass transfer can be achieved by an increased turbulence in the flow channel for exhaust gas. At the same time, a beneficial support of the exhaust gas plates relative to each other can be achieved. The in particular planar back of the stay can be beneficially used for placing the semipermeable membrane thereon.

Advantageously, a channel plate can be formed of an exhaust gas plate and a fresh gas plate. The two channel partial plates can be glued to each other and joined with further channel plates, comprised of an exhaust gas plate and a fresh gas plate, to a plate stack. Alternatively, the individual channel partial plates can be stacked separately on each other.

According to a beneficial embodiment of the humidifying device, the first group of flow channels can be arranged between the outer sides of two channel plates sequentially following each other in the stacking direction and the second group of flow channels can be arranged in the interior of the at least one channel plate between the semipermeable layers at both sides and delimited by the semipermeable layers in the stacking direction. In this way, an efficient flow guiding action of exhaust gas and fresh gas of the fuel cell system can be realized. Also, the moisture transfer from the exhaust gas to the fresh gas can be more efficiently designed in this manner.

According to a beneficial embodiment of the humidifying device, the respective channel partial plate can comprise a receiving surface for the semipermeable layer, wherein the receiving surface comprises at least at two oppositely positioned sides at the receiving surface a respective rim section which is higher than the receiving surface with semipermeable layer arranged thereon. When the channel partial plates are placed on each other, a flow channel is formed automatically between the channel partial plates with semipermeable layer arranged thereon due to the height difference between rim section and receiving surface. This flow channel is formed at two oppositely positioned sides by the outer sides of the semipermeable layers of the channel partial plates sequentially following each other in stacking direction and at the two other sides by the protruding length of the rim section protruding past the receiving surface of the channel partial plate with semipermeable layer arranged thereon.

According to a beneficial embodiment of the humidifying device, the two groups of flow channels can extend at a slant or transversely to each other. In particular, the flow channel between the outer sides of the channel plates, sequentially following each other in stacking direction, with semipermeable layers can be formed significantly narrower transversely to the longitudinal axis, in particular at most half as wide, than a width along the longitudinal axis of the flow channel, with the greatest width of the flow channels in the interior of the channel plate between its semipermeable layers at both sides. In this context, the outer side of the channel plate corresponds to the outer side of the semipermeable layer and the interior of the channel plate to the inner side of the semipermeable layer in relation to the channel plate. In this context, a single flow channel, which is delimited in stacking direction at both sides by semipermeable layers, can be in particular formed, respectively, between the outer sides of channel plates sequentially following each other in the stacking direction. The flow channel can be formed simply by placing channel partial plates on each other. Advantageously, the flow channels between the inner sides of the semipermeable layers can be configured identically and equidistantly. In particular, these flow channels can extend parallel to each other.

According to a beneficial embodiment of the humidifying device, the channel plates can be connected fluid-tightly to each other with the exception of the inflow or outflow regions. In particular, the channel plates can be connected to each other at the frames of the channel partial plates, in particular can be welded or glued to each other. In this manner, a reliable fluid-tight connection between the channel partial plates and a practically leakage-free plate stack with channel partial plates can be produced. At the same time, the plate stack can be mechanically very stable and robust.

According to a beneficial embodiment of the humidifying device, a second type of channel plates can be configured free of semipermeable layers. With this second type of channel plates, flow channels can be advantageously configured, for example, for fresh gas, for example, supply air, which also exhibit an effective influencing of the flow by generating turbulences and increase the efficiency of the humidifying device in this way.

According to a beneficial embodiment of the humidifying device, channel plates of the first type can be arranged alternatingly with channel plates of the second type in the stacking direction. Due to the alternating arrangement of the two types of channel plates, namely in that a channel plate with semipermeable layers and a channel plate without semipermeable layers are stacked alternately on each other, respectively, it is possible, for example, to configure advantageously flow channels for the fresh gas, for example, the supply air, which also exhibit an effective influencing of the flow by generating turbulences and increase the inefficiency of the humidifying device in this way.

According to an aspect of the invention, a channel partial plate, designed for a humidifying device, in particular for a fuel cell system, is proposed, comprising a circumferentially extending frame, wherein stays extending at a slant to a longitudinal axis are arranged between two oppositely positioned sides of the frame.

The embodiment of the channel partial plates can be designed such that stays extending at a slant extend in the flow region. Due to a mirrored or 180°-rotated installation of the channel partial plates when assembling a channel plate, the stays meet each other and therefore cross each other. The thereby resulting crossed rib structure in two planes leads to an undulate flow movement in the flow channel. The stays can guide the respective fluid toward the semipermeable layer and in this way, for example, improve a moisture transfer between the two groups of flow channels. Due to this targeted influencing of the flow, an improved mass transfer, in particular moisture transfer, can be achieved and the efficiency of the humidifying device can be increased in this way.

Advantageously, the channel partial plates in an embodiment can be of identical design. Alternatively, the channel partial plates can comprise at least one fresh gas plate and at least one exhaust gas plate whose stays in cross section, at least in sections thereof, are differently designed. In particular, the at least one fresh gas plate can comprise stays with an, at least in sections, L-shaped cross section in which an angled leg of the respective stay projects into a flow channel adjoining as intended. Alternatively or in addition, the at least one exhaust gas plate can comprise stays with an, at least in sections, U-shaped cross section in which two angled legs oppositely positioned at the stay project into a flow channel adjoining as intended. Advantageously, an improved mass transfer can be achieved by an increased turbulence in the flow channel for exhaust gas. At the same time, a beneficial support of the exhaust gas plates relative to each other can be achieved. The in particular planar back of the stay can be used beneficially for placing the semipermeable membrane thereon.

The channel partial plate can be formed advantageously of plastic material, in particular polyphenylene sulfide or fiber-reinforced polyphenylene sulfide. The channel partial plate, for example, can be injection-molded or embossed. The use of other plastic materials is possible as long as the plastic materials exhibit a water absorption as minimal as possible and no ion release and in addition are temperature-resistant.

Beneficially, at least the rim of the channel partial plate can be formed of plastic material, in particular of polyphenylene sulfide or fiber-reinforced polyphenylene sulfide.

According to a beneficial embodiment of the channel partial plate, at least two regions can be provided in a plate plane in which the stays are arranged mirror-symmetrically to each other. In this way, the manufacture of the channel partial plates, in particular by injection molding of plastics, can be designed advantageously.

According to a beneficial embodiment of the channel partial plate, the circumferentially extending frame can surround a receiving surface for a semipermeable layer. In particular, two rim sections oppositely positioned at the receiving surface can be designed higher than the other two oppositely positioned rim sections. In particular, in this context two oppositely positioned rim sections at both sides can protrude with a protruding length past the receiving surface in a stacking direction. The protruding length of the rim sections past the receiving surface is expediently so large that, even with the semipermeable layer arranged on the receiving surface, there exists still a protruding length of the rim past the semipermeable layer. When the channel partial plates are placed on each other, a flow channel is formed automatically between the channel partial plates with semipermeable layer arranged thereon due to the height difference between rim section and receiving surface. This flow channel is formed at two oppositely positioned sides by the outer sides of the semipermeable layers of the channel partial plates, sequentially following each other in the stacking direction, and at the two other sides by the protruding length of the rim section past the receiving surface of the channel partial plate with semipermeable layer arranged thereon.

According to an aspect of the invention, a channel plate, designed for a humidifying device, in particular for a fuel cell system, is proposed, comprising two channel partial plates, arranged on each other in a stacking direction, with a circumferentially extending frame. In this context, stays extending at a slant to a longitudinal axis are arranged between two oppositely positioned sides of the respective frame, wherein the stays of the channel partial plates cross each other, viewed in stacking direction.

The embodiment of the channel partial plates can be designed such that stays extending at a slant extend in the flow region. Due to the mirrored or 180°-rotated installation of the channel partial plates when assembling a channel plate, the stays meet each other and thereby cross each other. The thereby produced crossed rib structure in two planes leads to an undulate flow movement in the flow channel. The stays can guide the respective fluid toward the semipermeable layer and in this way, for example, improve a moisture transfer between the two groups of flow channels. Due to this targeted influencing of the flow, an improved mass transfer, in particular moisture transfer, can be achieved and the efficiency of the humidifying device increased in this way.

According to a beneficial embodiment, the channel plate can comprise two identical channel partial plates which, rotated by 180° along a longitudinal axis, are arranged so as to rest on each other. Due to the arrangement of the channel partial plates rotated by 180° along the longitudinal axis, the inner sides with the stays are arranged in the channel plate so as to immediately rest on each other. In this way, advantageously a crossed rib structure of the channel plate results which, for a flow guiding action, for example, of the exhaust gas, is advantageous in relation to swirling of the exhaust gas and thus to the transfer of the moisture of the exhaust gas to the dry fresh gas. Particularly advantageous is that such an arrangement can be achieved with identical channel partial plates so that for producing the channel plate only one tool for the manufacture of one channel partial plate is necessary.

As an alternative, it can however be provided that the channel partial plates comprise at least one fresh gas plate and at least one exhaust gas plate whose stays in cross section are differently designed at least in sections thereof. In particular, the at least one fresh gas plate can comprise stays with a cross section which, at least in sections, is L-shaped, in which an angled leg of the respective stay projects into the adjoining flow channel. Alternatively or in addition, the at least one exhaust gas plate can comprise stays with a U-shaped cross section at least in sections, in which two angled legs, oppositely positioned at the stay, project into the adjoining flow channel. Advantageously, an improved mass transfer can be achieved by an increased turbulence in the flow channel for exhaust gas. At the same time, a beneficial support of the exhaust gas plates relative to each other can be achieved. The in particular planar back of the stay can be used beneficially for placing the semipermeable membrane thereon.

According to a beneficial embodiment of the channel plate, the respective circumferentially extending frame of a channel partial plate can surround a receiving surface for a semipermeable layer. In particular, two oppositely positioned rim sections at the receiving surface can be designed higher than the other two oppositely positioned rim sections. In particular, in this context two oppositely positioned rim sections can protrude at both sides past the receiving surface in a stacking direction with a protruding length. When the channel partial plates are placed on each other, a flow channel is automatically formed between the two channel partial plates with the semipermeable layer arranged thereon due to the height difference between rim section and receiving surface. This flow channel is formed at two oppositely positioned sides by the outer sides of the semipermeable layer of the channel partial plates sequentially following each other in stacking direction and at the two other sides by the protruding length of the rim section past the receiving surface of the channel partial plate with the semipermeable layer arranged thereon.

According to an alternative embodiment of the humidifying device, channel plates can be arranged in the stacking direction which comprise no stays or any other configuration for influencing the flow. The flow in this embodiment can be influenced by a separate insertion part. At least one insertion part can comprise, for example, stays which advantageously provide flow channels for the fresh gas, for example, supply air. In a particular embodiment, due to the arrangement of a plurality of insertion parts, a crossed rib structure can be produced, and the efficiency of the humidifying device increased in this way.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will expediently consider the features also individually and combine them to expedient further combinations.

DETAILED DESCRIPTION

Figure 1:
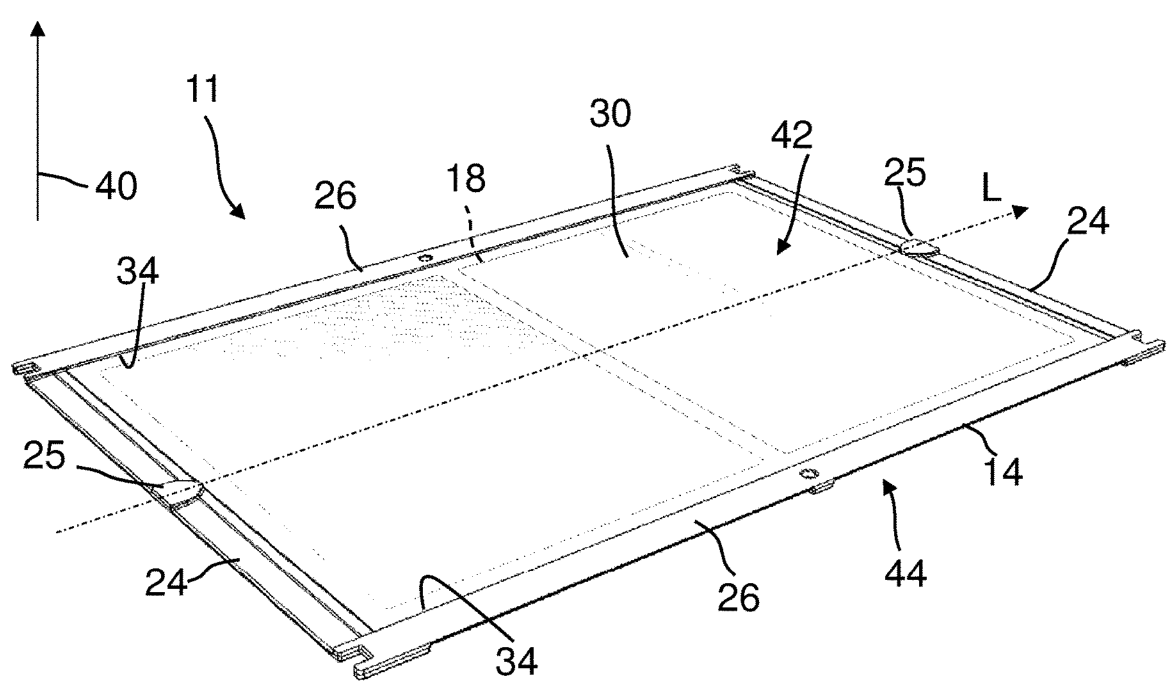
FIG. 1 shows a channel partial plate with a semipermeable layer on one side for a humidifying device, in particular for a fuel cell system, according to an embodiment of the invention in isometric illustration.

In the Figures, same or same-type components are identified with same reference characters. The Figures show only examples and are not to be understood as limiting.

Figure 2:
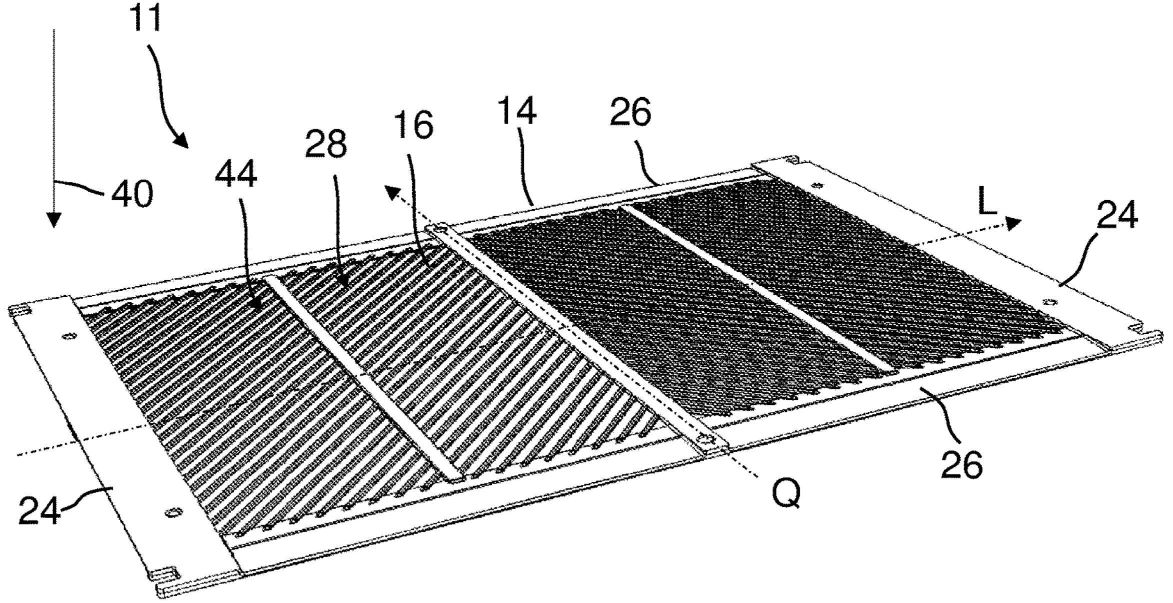
FIG. 2 shows the channel partial plate according to FIG. 1 from the rear with stays extending at a slant to its longitudinal direction.

FIG. 1 shows a channel partial plate 11 for a humidifying device 100, in particular for a fuel cell system, with semipermeable layer 30 according to an embodiment of the invention in isometric illustration while FIG. 2 shows the channel partial plate 11 from the opposite side.

The channel partial plate 11 comprises a circumferentially extending frame 14, wherein stays 16 extending at a slant to a longitudinal axis L are arranged between two oppositely positioned sides of the frame 14, as can be seen in FIG. 2. The longitudinal axis L extends perpendicularly to a stacking direction 40, which is indicated by an arrow in the Figure. Channel plates 10 (FIGS. 3-7) can be formed from the channel partial plates 11 and, as intended, can be stacked on each other along the stacking direction 40. The cross section of the channel partial plates 11 can be rectangular, for example.

In this context, at least two regions in a plate plane 28 of the channel partial plate 11 can be provided, as in the embodiment illustrated in FIG. 2, in which the stays 16 are arranged relative to each other mirror-symmetrically to a transverse axis Q. This can be advantageous with respect to manufacturing reasons. The transverse axis Q is perpendicular to the stacking direction 40 and to the longitudinal axis L.

One flat side of the channel partial plate 11 is formed by the semipermeable layer 30, the other flat side by the stays 16.

The circumferentially extending frame 14 surrounds a receiving surface 18 for a semipermeable layer 30, for example, a membrane, in particular a moisture-permeable membrane. The semipermeable layer 30 can be glued onto the receiving surface 18, for example.

On at least two sides positioned opposite each other at the receiving surface 18, the receiving surface 18 comprises a rim section 26, respectively, which is embodied higher than the receiving surface 18 with semipermeable layer 30 arranged thereon.

The two rim sections 26 positioned opposite each other at the receiving surface 18 are embodied higher than the other two oppositely positioned rim sections 24.

In particular, the two oppositely positioned rim sections 26 at both sides can protrude with a protruding length 34 past the receiving surface 18 in a stacking direction 40. As can be seen in the Figure, the semipermeable layer 30 is positioned deeper than the rim sections 26 and, for example, can be flush with the rim sections 24, wherein central spacers 25 on the rim sections 24 protrude by the protruding length 34 in upward direction. In this manner, flow channels can be formed when stacking the channel partial plates 11. The spacers 25 of the rim sections 24 support each other mutually in this context.

The side of the channel partial plate 11 with the semipermeable layer 30 forms the outer side of a channel plate 10 (FIGS. 3-7). At its oppositely positioned rear side, the rim sections 24 are somewhat higher than the rim sections 26 and of a planar configuration. When the two channel partial plates 11 are placed on each other in order to form a channel plate 10 (FIGS. 3-7), the rear sides of the rim sections 24 which are embodied planar contact each other. One of the two channel plates 11 is rotated in this context by 180° about the longitudinal axis L.

Figure 3:
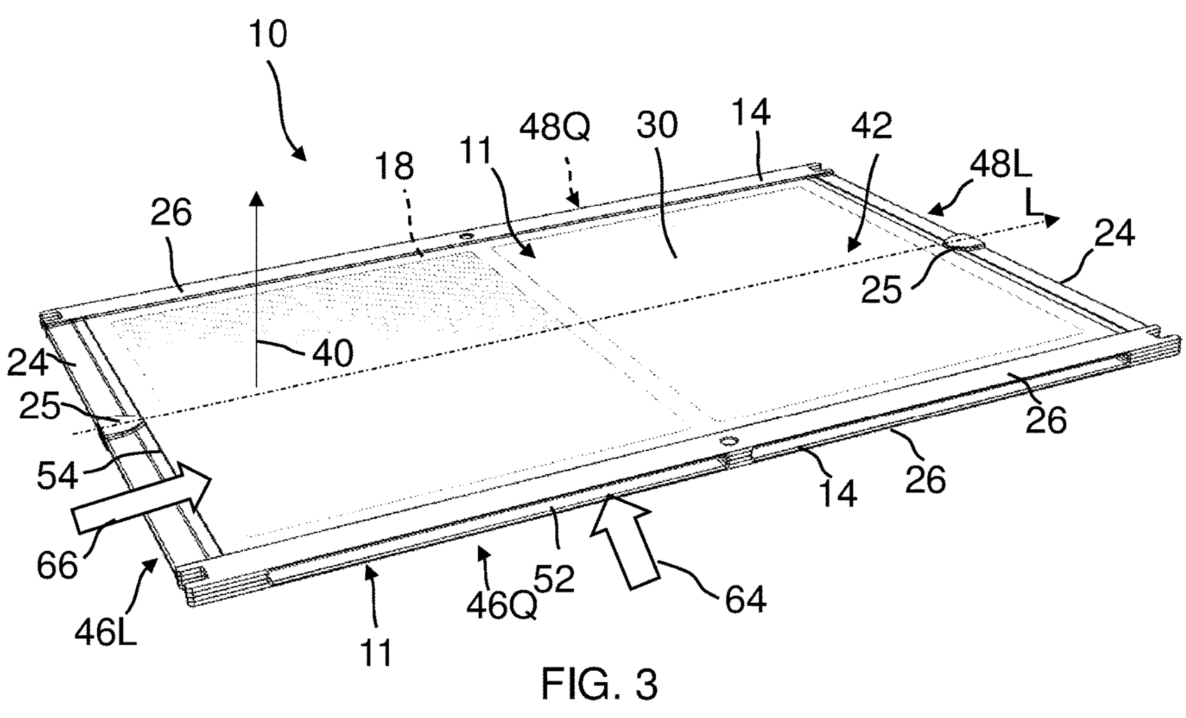
FIG. 3 shows a channel plate of two channel partial plates with semipermeable layers for a humidifying device, in particular for a fuel cell system, according to an embodiment of the invention in isometric illustration.
Figure 4:
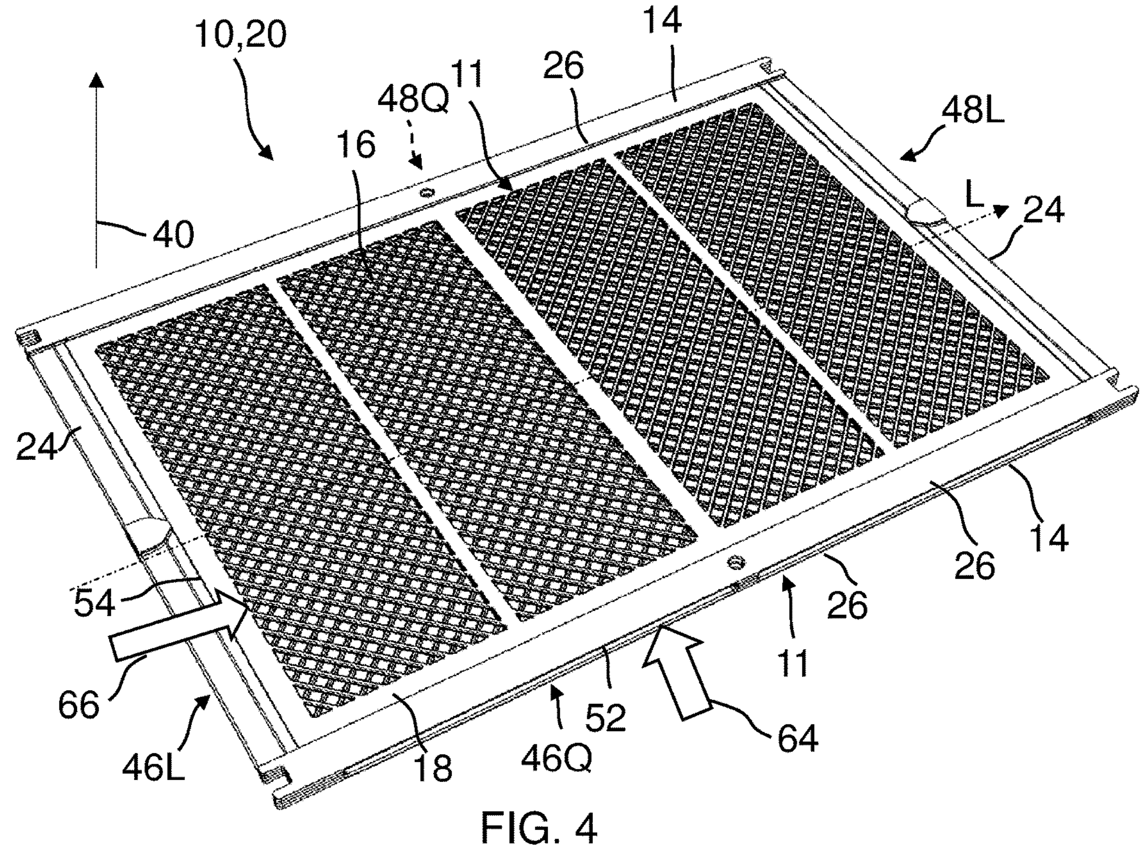
FIG. 4 shows the channel plate according to FIG. 3, illustrated without semipermeable layer.
Figure 5:
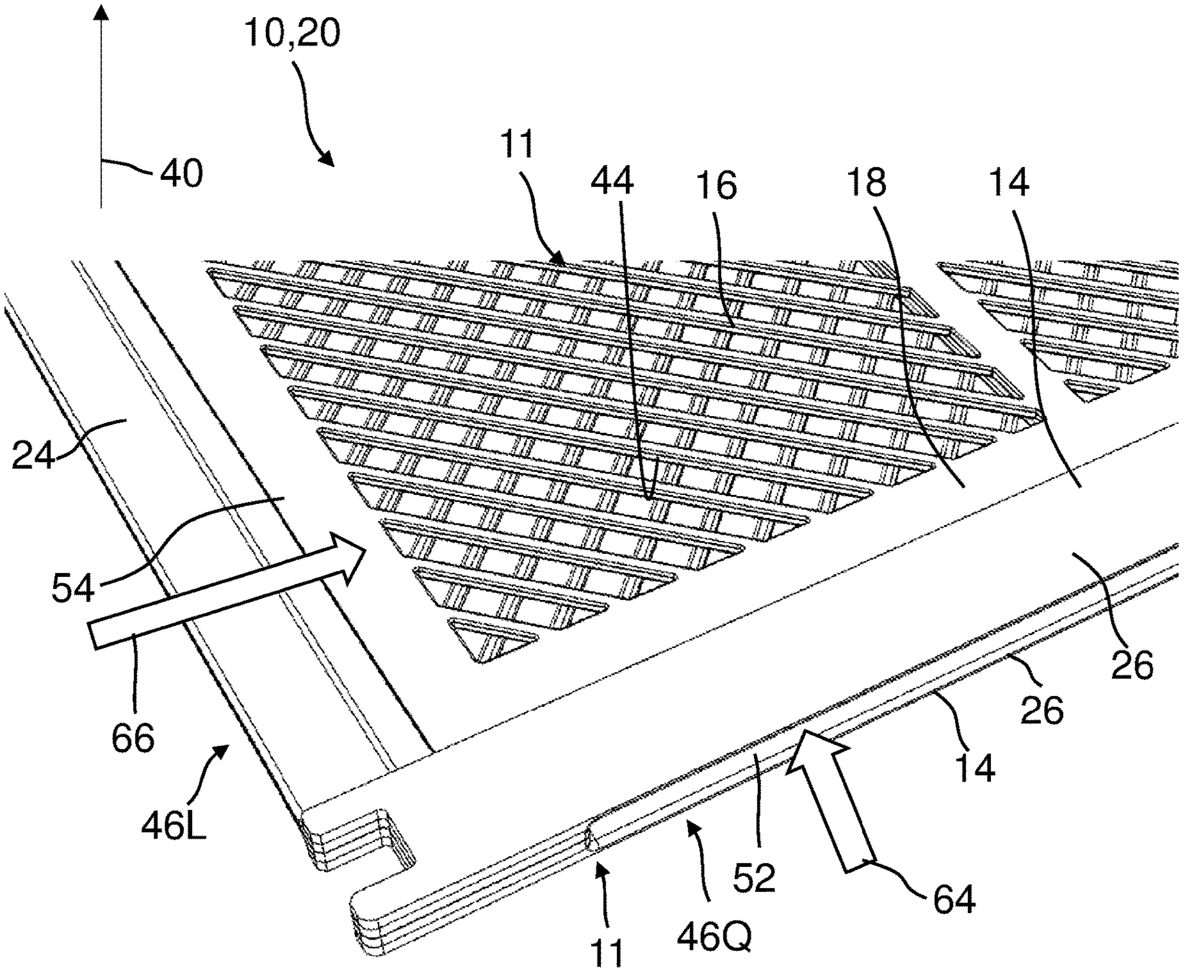
FIG. 5 shows an enlarged detail of the channel plate according to FIG. 4, illustrated without semipermeable layer.

FIG. 3 shows a channel plate 10 for a humidifying device 100, in particular for a fuel cell system, according to an embodiment of the invention in isometric illustration, while in FIG. 4 the channel plate 10 according to FIG. 3 is illustrated without semipermeable layer 30. FIG. 5 shows an enlarged detail of the channel plate 10.

The channel plate 10 comprises two channel partial plates 11, arranged in a stacking direction 40 on each other, with a circumferentially extending frame 14. The two channel partial plates 11 are placed on each other with their stays 16 facing each other. The stays 16 of the two channel partial plates 11 form the interior 44 of the channel plates 10. The semipermeable layers 30 form the two outer sides 42 of the channel plates 10.

The at least one channel plate 10 comprises in this context two identical channel partial plates 11 which are arranged, rotated by 180° along the longitudinal axis, so as to rest on each other. Due to the arrangement of the channel partial plates 11 rotated by 180° along the longitudinal axis L, the stays 16 in the channel plate 10 are arranged so as to rest immediately on each other. In this way, advantageously a crossed rib structure in the interior 44 of the channel plate 10 is formed which, for a flow guiding action, for example, of the exhaust gas 64, is advantageous in relation to swirling of the exhaust gas 64 and thus to the transfer of the moisture of the exhaust gas 64 to the dry fresh gas 66, in particular supply air. It is particularly advantageous that such an arrangement can be achieved with identical channel partial plates 11 so that for the manufacture of the channel plate 10 only one tool for the manufacture of one channel partial plate 11 is necessary.

The respective circumferentially extending frame 14 of the channel partial plates 11 surrounds a receiving surface 18 for a semipermeable layer 30, for example, a moisture-permeable membrane. In particular, two oppositely positioned rim sections 26 at the receiving surface 18 are configured higher than the other two oppositely positioned rim sections 24 in this context. The two oppositely positioned rim sections 26, which extend in the direction of the longitudinal axis L, protrude at both sides past the receiving surface 18 in a stacking direction 40 with a protruding length 34 so that flow channels 54 can form when channel plates are stacked on each other in stacking direction 40.

Stays 16 extending at a slant, which can be seen with semipermeable layer 30 removed in FIG. 4, are arranged between two oppositely positioned sides of the respective frame 14, wherein the stays 16 of the channel partial plates 11 stacked on each other cross each other, viewed in stacking direction 40.

The channel plate 10 comprises a flow channel 52 which is formed by the channel partial plates 11 placed on each other and extends in the interior 44 of the channel plates 10. The flow channel 52 can be used, for example, for the exhaust gas 64.

When two channel plates 10 are stacked on each other, a further flow channel 54 is then formed which extends perpendicularly to the first flow channel 52 and extends respectively between the semipermeable layers 30 of the two channel plates 10 placed on each other. The further flow channel 54 can be used, for example, for the fresh gas 66 of the fuel cell system.

When stacking the channel plates 10 in stacking direction 40, their rim sections 24 with their central spacers 25 (FIG. 1, FIG. 3) and their rim sections 26, elevated compared to the rim sections 24, contact each other.

In this context, the respective inflow region 46L, 46Q of the two flow channels 52, 54 is formed in the drawing plane at the front while the outflow region 48L, 48Q is formed rearward in the drawing plane. One flow channel 52 extends transversely to the longitudinal axis L, the other flow channel 54 extends in the direction of the longitudinal axis L.

In the enlarged illustration in FIG. 5, the stays 16 which are arranged in a crossed arrangement can be seen in the interior 44 of the channel plate 10 formed by the two channel partial plates 11 arranged on each other.

Figure 6:
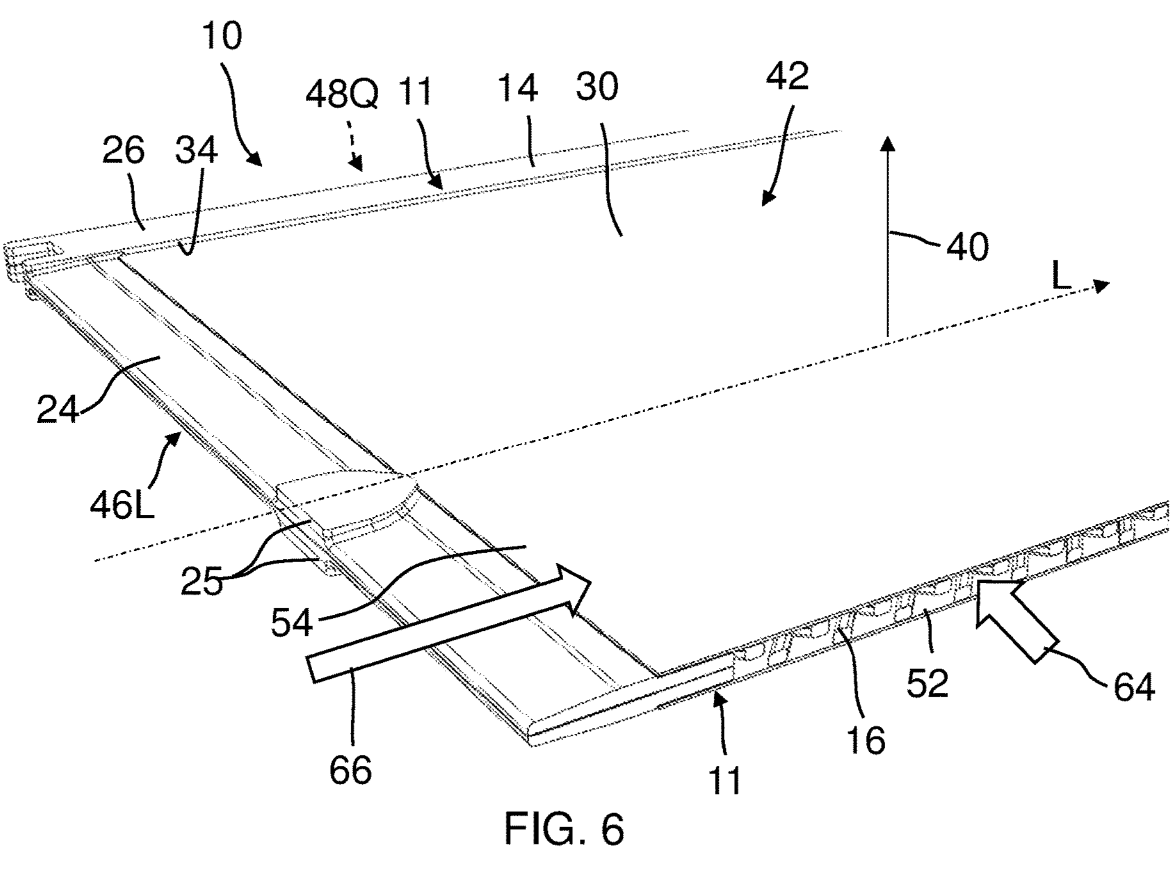
FIG. 6 shows the channel plate according to FIG. 3 in longitudinally sectioned illustration.
Figure 7:
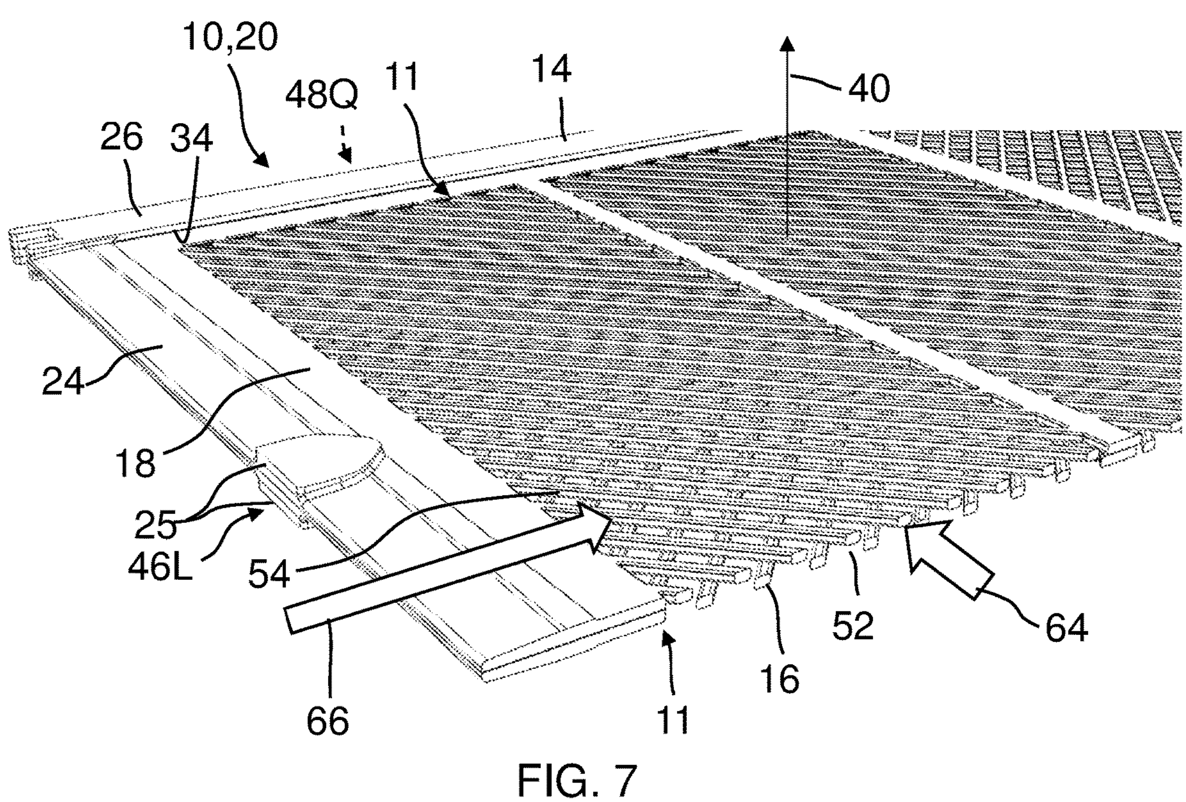
FIG. 7 shows the channel plate according to FIG. 4 in longitudinally sectioned illustration.

FIG. 6 shows the channel plate 10 according to FIG. 3 in longitudinally sectioned illustration while in FIG. 7 the channel plate 10 is illustrated with semipermeable layer 30 removed.

The embodiment of the channel partial plates 11 is designed such that stays 16 extending at a slant extend in the flow region. Due to the mirrored or 180°-rotated installation of the channel partial plates 11, the stays 16 which are embodied integrated in the channel partial plates 11 meet each other and cross each other thereby. The crossed rib structure produced in this way in two planes leads to an undulate flow movement in the flow channel 52. The stays 16 can guide the respective fluid toward the semipermeable layer 30 and in this way, for example, improve a moisture transfer between the two groups of flow channels 52, 54. Due to this targeted influencing of the flow a better mass transfer, in particular moisture transfer, can be achieved and thereby the efficiency of the humidifying device 100 increased.

In the sectioned illustration, the respectively crossed stays 16, arranged above each other, of the two channel partial plates 11 stacked on each other can be seen.

The stays 16 can be arranged advantageously equidistantly to each other. However, angle, distance, and width of the stays 16 can definitely vary. A cross section of the stays 16 can be configured, for example, rectangular, rectangular with rounded edges, or round. Advantageously, for example, rectangular stays 16 of channel partial plates 11 stacked on each other can support each other mutually in order to bear a pressure of the semipermeable layer 30 weighing on them. Between the oppositely positioned stays 16, a thin gap can however be formed for fluidic reasons.

Figure 15:
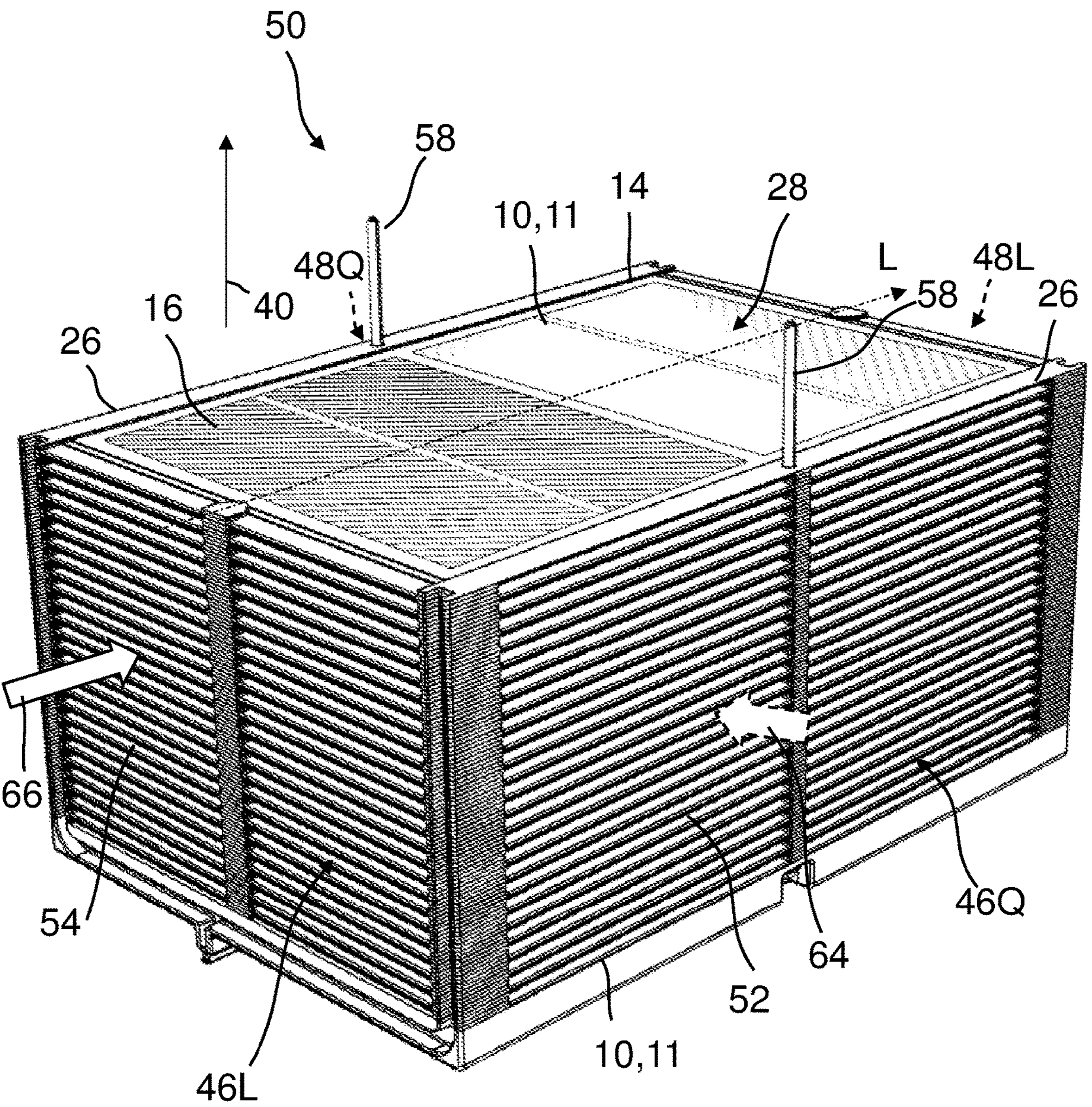
FIG. 15 shows a plate stack of a humidifying device, in particular for a fuel cell system, according to an embodiment of the invention as assembled in schematic illustration.
Figure 16:
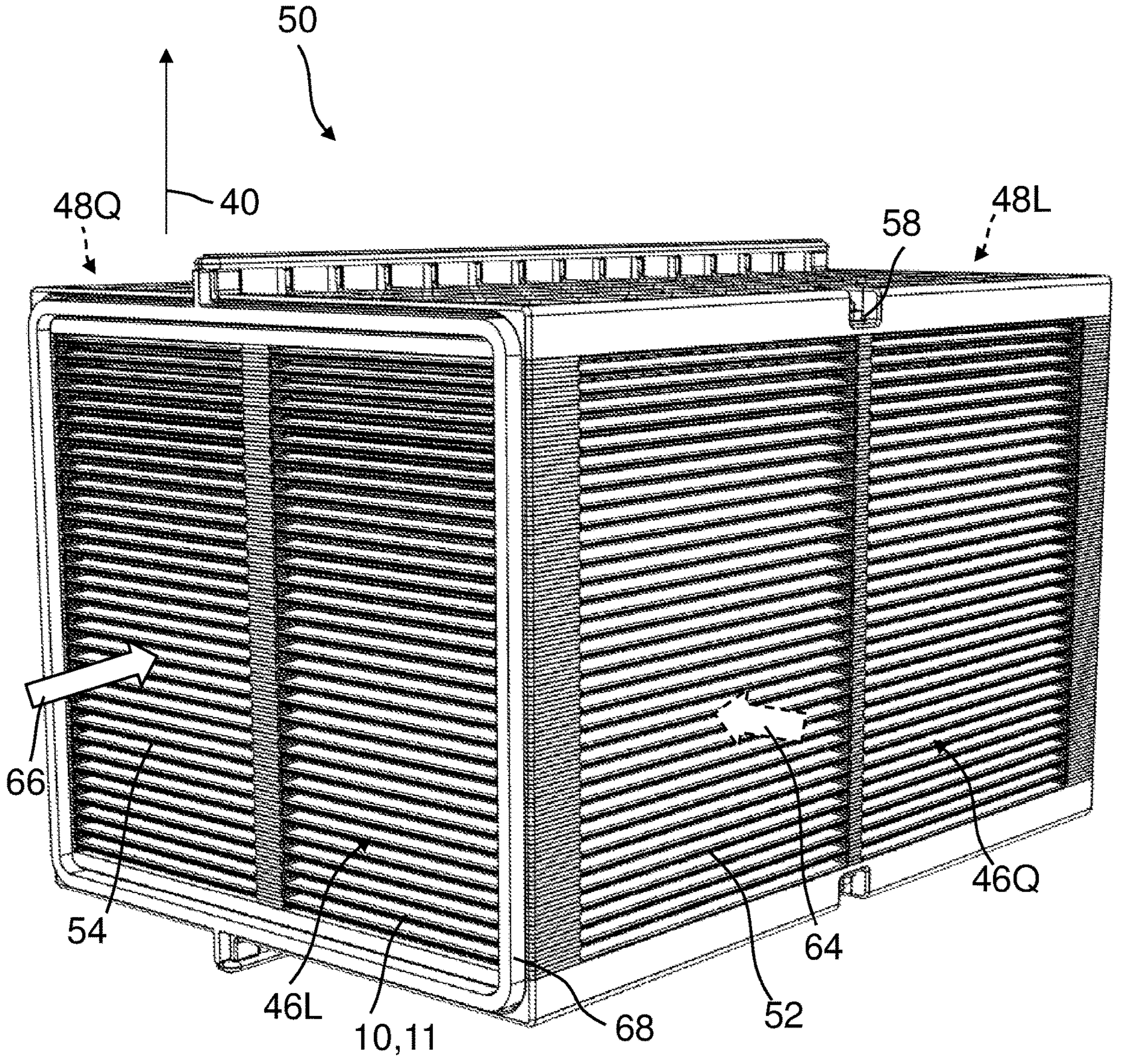
FIG. 16 shows a plate stack of a humidifying device, in particular for a fuel cell system, according to an embodiment of the invention in isometric illustration.

Advantageously, a channel plate 10 can be formed from a pair of channel partial plates 11 which are stacked on each other for forming a plate stack 50 (FIGS. 15, 16) in stacking direction 40. Alternatively, the channel partial plates 11 can also be individually stacked on each other and joined to a plate stack 50 (FIGS. 15, 16). Advantageously, the channel partial plates 11 can be glued to each other, for example.

FIGS. 8 to 14 show a further embodiment of the invention with channel partial plates 11 formed as fresh gas plates 12 and exhaust gas plates 13.

Figure 8:
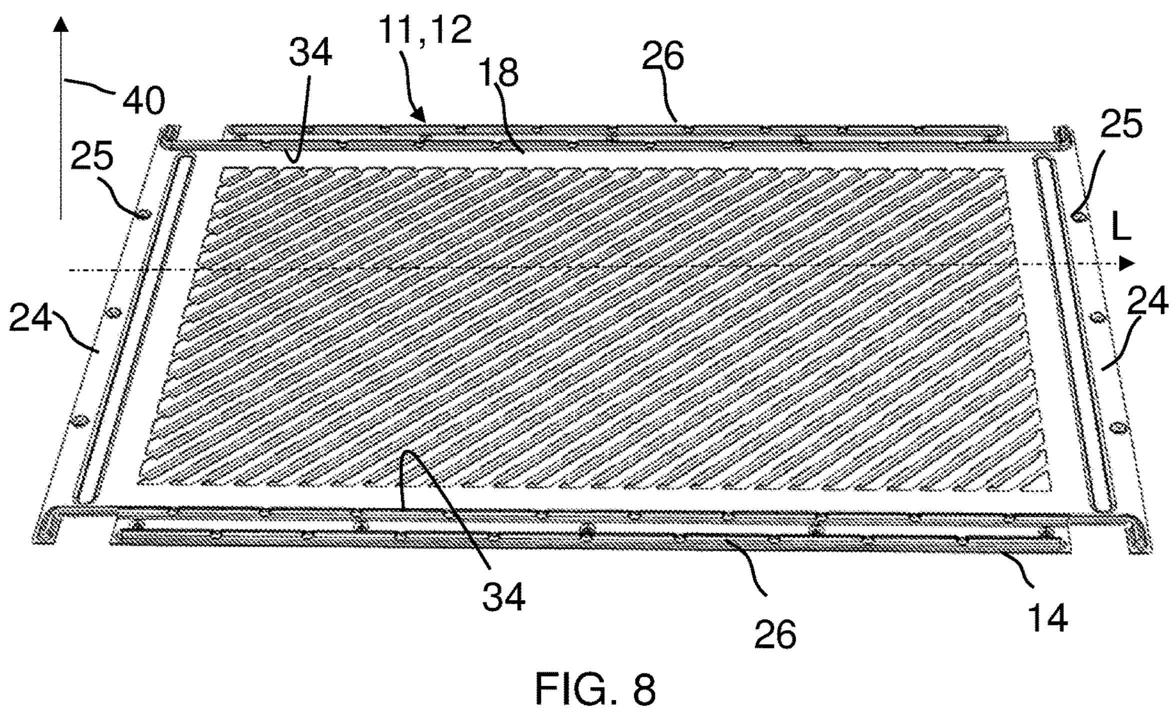
FIG. 8 shows a channel partial plate in the form of a fresh gas plate according to an embodiment of the invention, illustrated without semipermeable layer.
Figure 9:
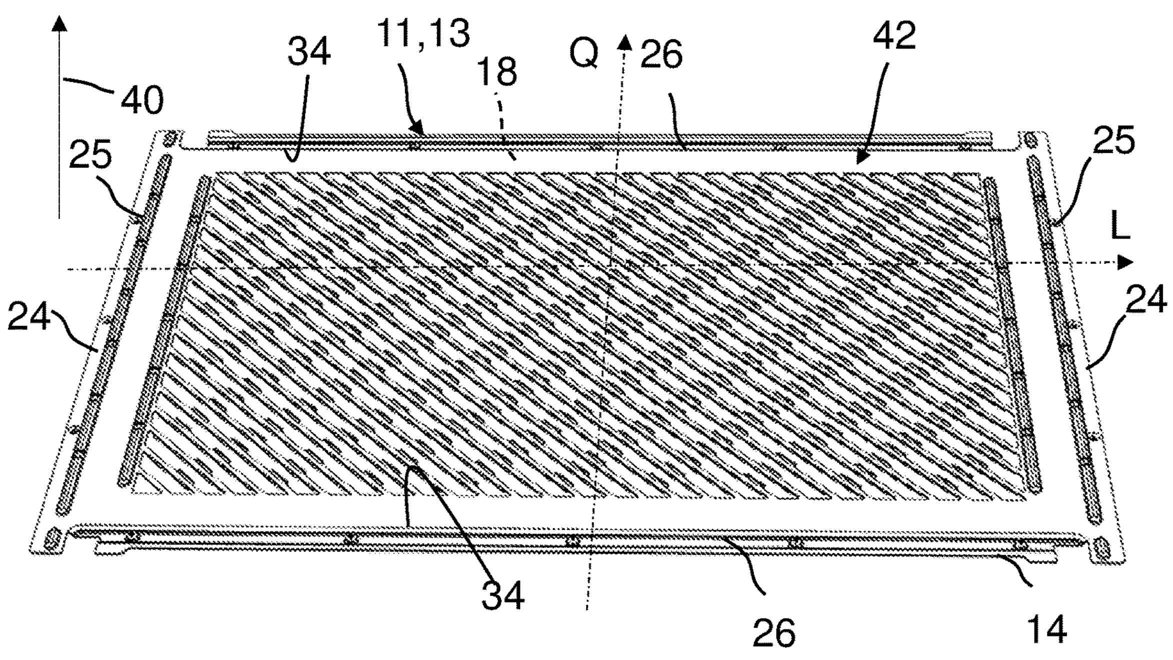
FIG. 9 shows a channel partial plate in the form of an exhaust gas plate according to an embodiment of FIG. 8.
Figure 10:
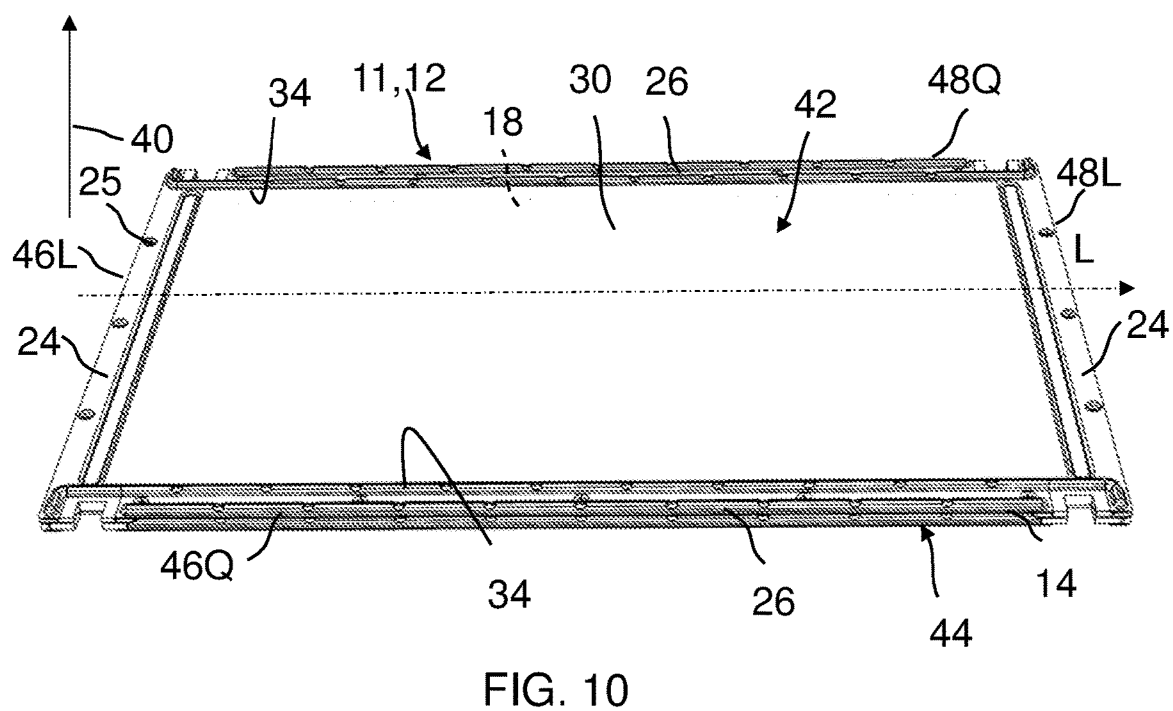
FIG. 10 shows a stack with three channel partial plates which form a channel pair of fresh gas channel and exhaust gas channel, illustrated with semipermeable layer.

FIG. 8 shows a channel partial plate 11 in the form of a fresh gas plate 12 illustrated without semipermeable layer 30 (FIG. 10). FIG. 9 shows a channel partial plate 11 in the form of an exhaust gas plate 13.

The channel partial plate 11 in the form of the fresh gas plate 12 comprises a circumferentially extending frame 14, wherein stays 16 extending at a slant in relation to a longitudinal axis L are arranged between two oppositely positioned sides of the frame 14. In FIG. 8, the stays 16 extend from bottom left to top right, for example.

The longitudinal axis L extends perpendicularly to a stacking direction 40 which is indicated by an arrow in the Figure. Channel plates 10 (FIGS. 3-7) can be formed from the channel partial plates 11 which, as intended, can be stacked on each other along the stacking direction 40. The cross section of the channel partial plates 11 can be rectangular, for example. A flat side of the channel partial plate 11 is formed by the semipermeable layer 30, the other flat side by stays 16.

The stays 16 have a cross section which along the stays is embodied alternatingly L-shaped and U-shaped. In case of the L-shaped cross section, a leg 15 (FIG. 14) is angled such that it projects into the adjoining flow channel when assembled. In case of the U-shaped cross section, two legs 15, 17 (FIG. 14) oppositely positioned at the stay 16 are angled such that they project into the adjoining flow channel when assembled. In FIG. 8, the legs 15, 17 (FIG. 14) project into the drawing plane.

The circumferentially extending frame 14 surrounds a receiving surface 18 for a semipermeable layer 30, for example, a membrane, in particular a moisture-permeable membrane. The semipermeable layer 30 can be glued onto the receiving surface 18, for example.

On at least two sides which are oppositely positioned at the receiving surface 18, the receiving surface 18 for the semipermeable membrane 30 (FIG. 10) comprises a rim section 26, respectively, which is higher than the receiving surface 18 with semipermeable layer 30 arranged thereon.

The rim sections 26 which are oppositely positioned at the receiving surface 18 are embodied higher than the other two oppositely positioned rim sections 24.

In particular, the two oppositely positioned rim sections 26 at both sides can protrude past the receiving surface 18 in a stacking direction 40 with a protruding length 34. Spacers 25 are arranged at the rim sections 24. In this way, flow channels can be formed when stacking channel partial plates 11. The spacers 25 of the rim sections 24 support themselves mutually in this context. Fresh gas can flow in a flow channel delimited by two fresh gas plates 12 in the direction of the longitudinal axis L.

The channel partial plate 11 illustrated in FIG. 9 in the form of an exhaust gas plate 13 comprises stays 16 which, like the fresh gas plate 12, comprise along their longitudinal extension alternatingly an L-shaped and a U-shaped cross section. In FIG. 9, the legs 15, 17 (FIG. 14) of the L-shaped cross section and of the U-shaped cross section protrude out of the drawing plane. The receiving surface 18 for the semipermeable membrane 30 (FIG. 10) is arranged on the side of the exhaust gas plate 13 which is facing away from the observer.

In FIG. 9, the stays 16 at the exhaust gas plate 13 extend from bottom right to top left. Exhaust gas can flow in a flow channel delimited by two semipermeable layers 30 in direction of a transverse axis Q. The transverse axis Q is perpendicular to the stacking direction 40 and to the longitudinal axis L.

When fresh gas plates 12 and exhaust gas plates 13 are stacked alternatingly on each other, the stays 16 of fresh gas plates 12 and exhaust gas plates 13 cross each other. In this context, the legs 15, 17 of the stays 16 support each other mutually on one side of the fresh gas plates 12 and exhaust gas plates 13 while the semipermeable layers 30 are arranged at the oppositely positioned side of the fresh gas plates 12 and exhaust gas plates 13. On this side, the back of the stays of the stays 16 are located which are positioned in the plane of the receiving surface 18 and support the semipermeable layer 30.

Figure 11:
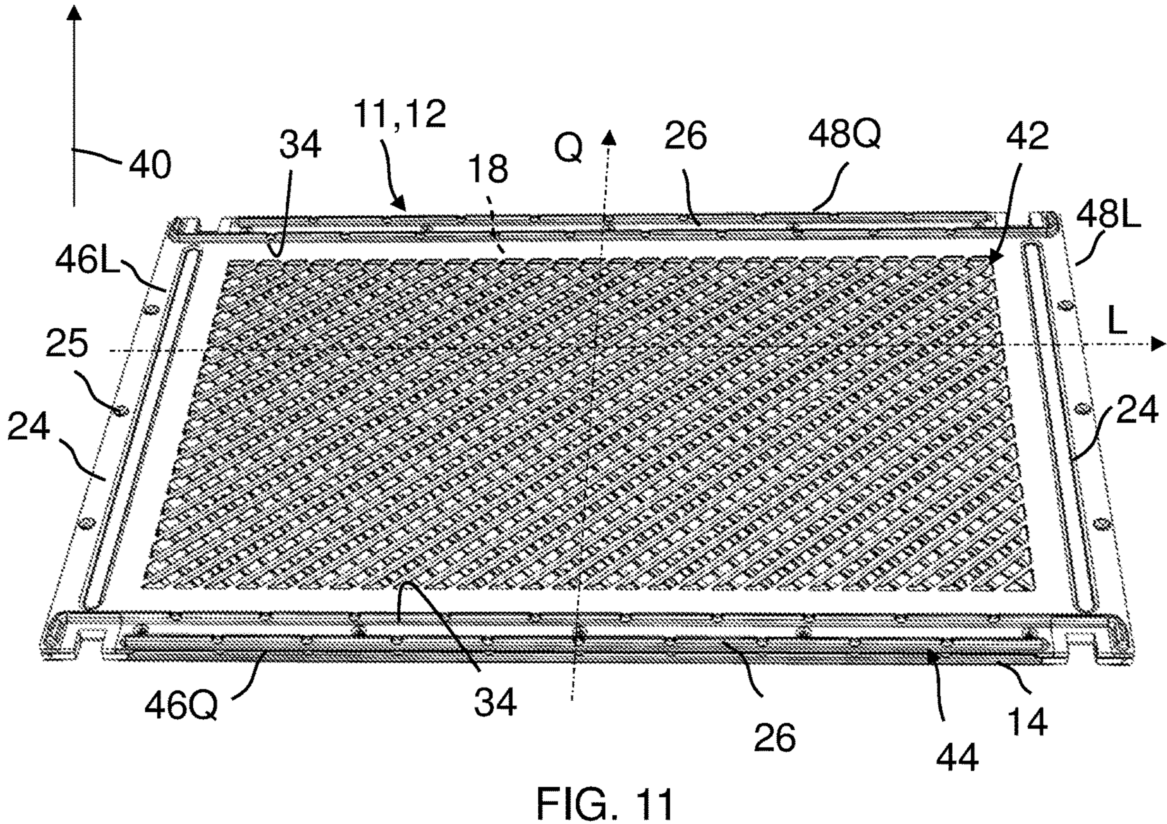
FIG. 11 shows the stack with three channel partial plates of FIG. 10 without semipermeable layer.
Figure 12:
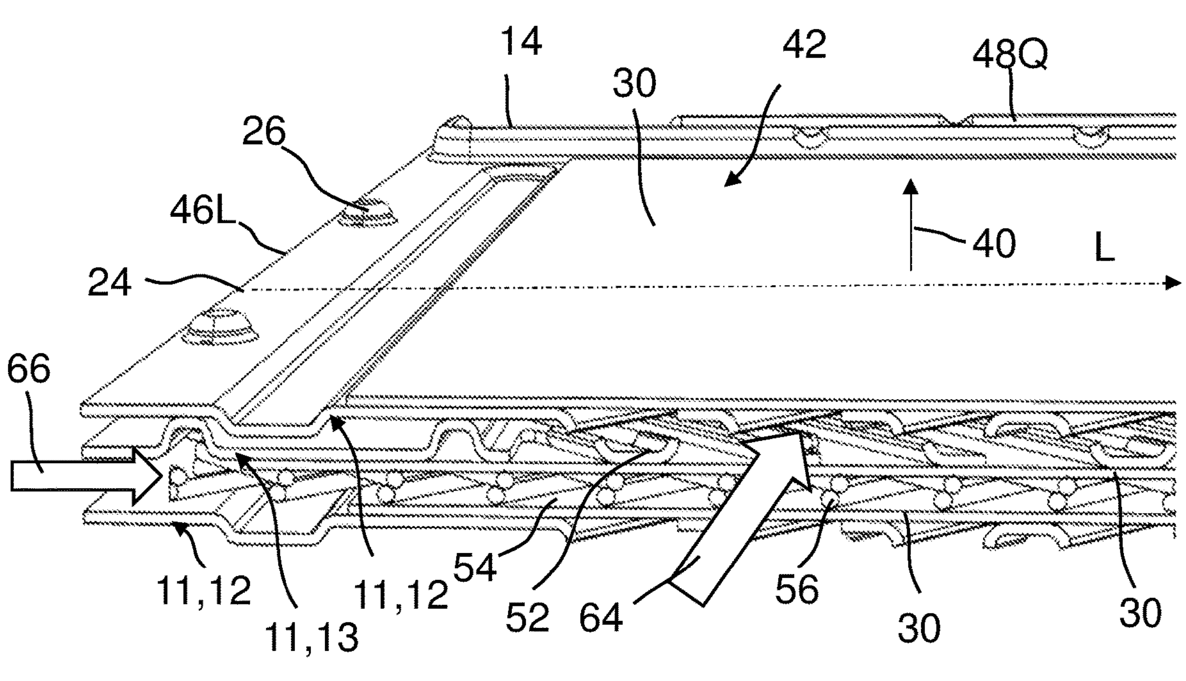
FIG. 12 shows a detail of the stack with three channel partial plates of FIG. 10.

FIG. 10 shows a stack of three channel partial plates 11 which form a channel pair with a flow channel 52 for exhaust gas and a flow channel 54 for fresh gas, illustrated with semipermeable layer 30. FIG. 11 shows the stack with three channel partial plates 11 of FIG. 10 without semipermeable layer 30. FIG. 12 shows a detail of the stack with three channel partial plates 11 of FIG. 10.

The semipermeable layer 30 is positioned, as can be seen in the Figure, lower than the rim sections 26 and, for example, can be flush with the rim sections 24, wherein spacers 25 on the rim sections 24 protrude by the protruding length 34 in upward direction.

As can be seen in the detail view in FIG. 12, in the Figure from bottom to top, a fresh gas plate 12 is followed by an exhaust gas plate 13 and again by a fresh gas plate 12. Between the oppositely positioned semipermeable layers 30 of the lower fresh gas plate 12 and of the central exhaust gas plate 13, the flow channel 54 for the fresh gas 66 extends from the inflow region 46L for the fresh gas 66 along the longitudinal axis L. The distance of the two channel partial plates 11 is stabilized by an inserted grid 56. The central exhaust gas plate 13 and the top fresh gas plate 12 support each other mutually by the legs of their stays 16. Exhaust gas 64 flows here through the thus formed flow channel 52 transversely to the longitudinal axis L toward the outflow region 48Q of the exhaust gas 64.

The top fresh gas plate 12 and the central exhaust gas plate 13 are glued to each other in the region of the rim section 24.

Figure 13:
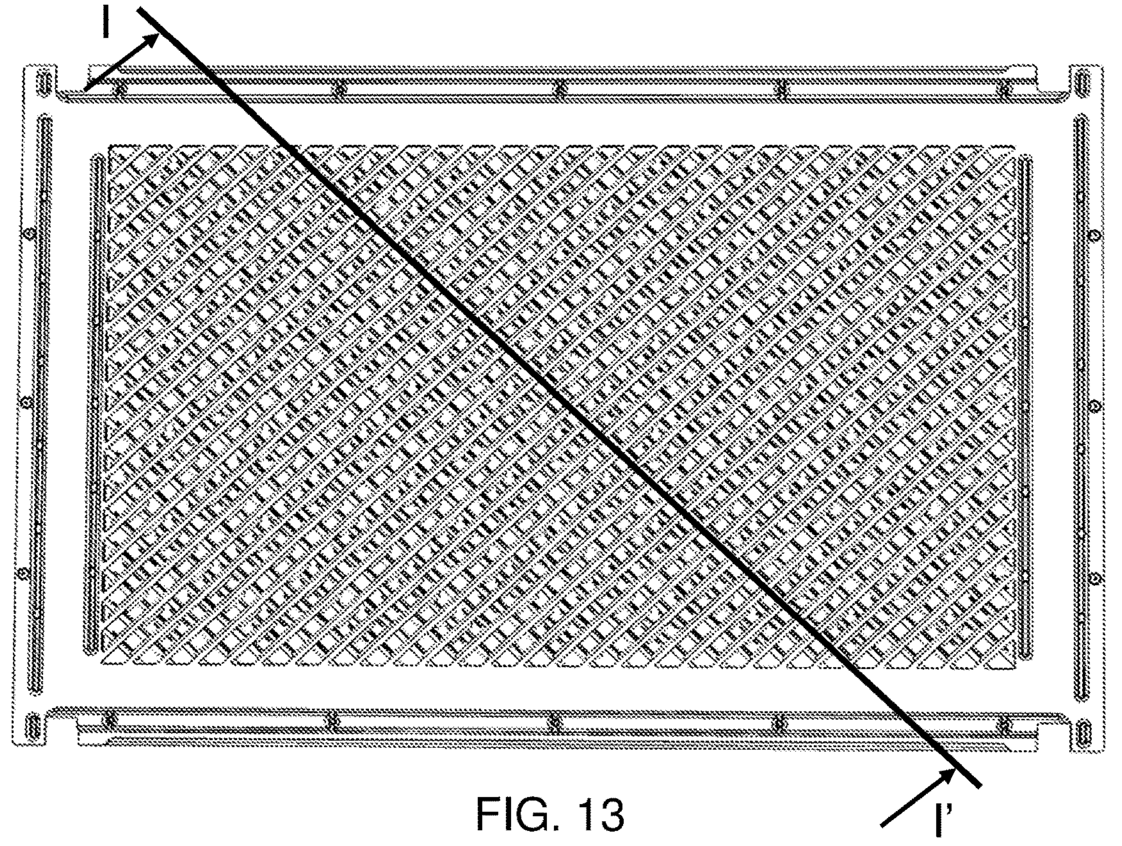
FIG. 13 shows a plan view of the stack of channel partial plates of FIG. 10 without semipermeable layer with a section plane I-I'.
Figure 14:
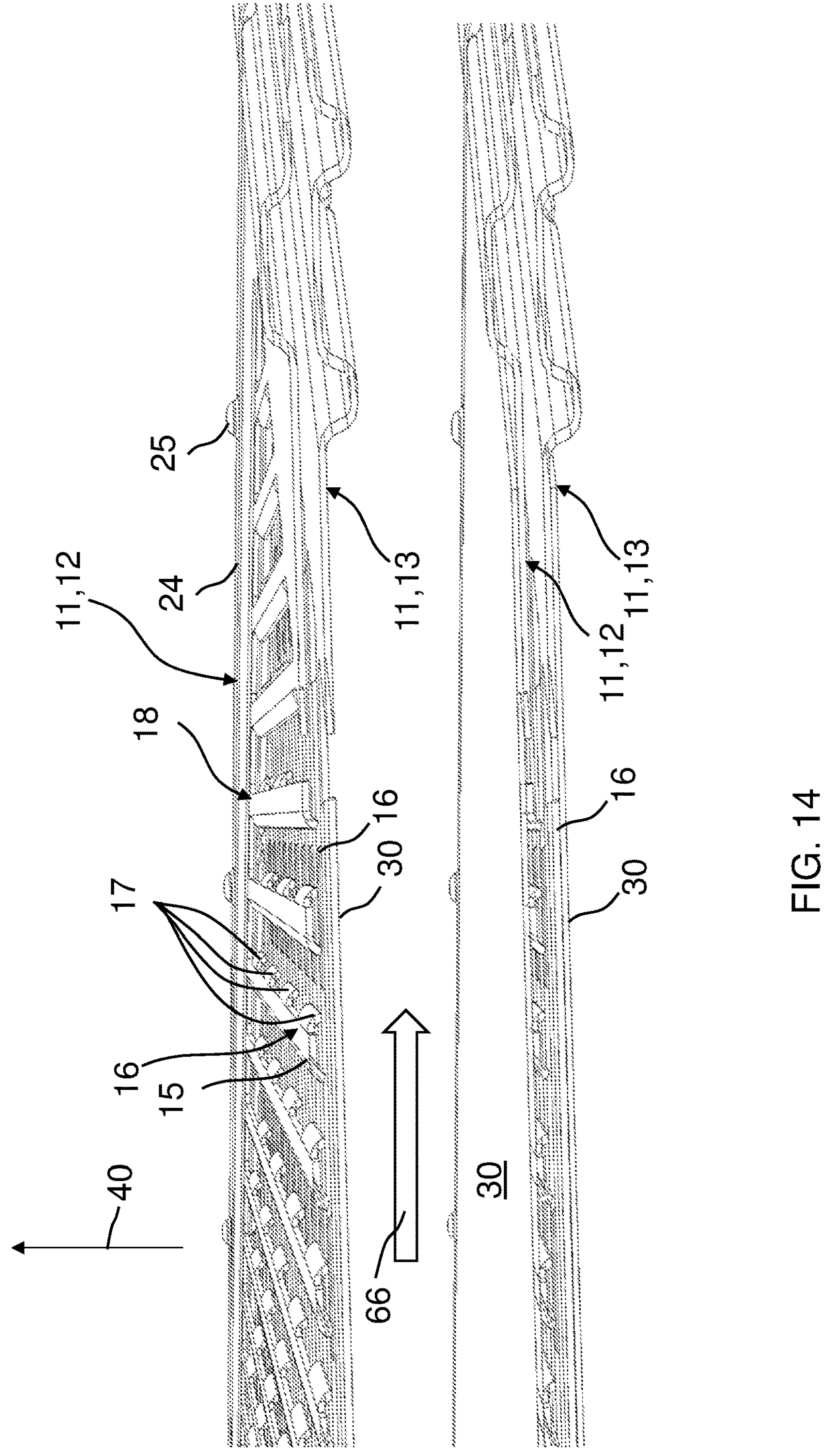
FIG. 14 shows a detail according to the section plane I-I' in FIG. 13.

FIG. 13 shows a plan view of the stack of channel partial plates 11 of FIG. 10 illustrated without semipermeable layer with indicated section plane I-I'. FIG. 14 shows a detail of the section plane I-I' in FIG. 13.

The alternating arrangement of L-shaped and U-shaped cross sections of the stays 16 with legs 15 on one side, on the one hand, and angled legs 15, 17 at both sides, on the other hand, can be seen. In this example, no grid is inserted in the flow channel for fresh gas 66.

FIG. 15 shows a plate stack 50 of a humidifying device 100, in particular for a fuel cell system, according to an embodiment of the invention as assembled in isometric illustration while the complete plate stack 50 is illustrated in FIG. 16.

The humidifying device 100 according to the invention comprises a plurality of channel plates 10, 20 sequentially following each other in a stacking direction 41 in a plate stack 50, as illustrated in FIGS. 3 to 7. In the plate stack 50, at least two groups of flow channels 52, 54 are formed which are separated by semipermeable layers 30, in particular moisture-permeable layers 30, and which extend transversely relative to each other. In this context, a channel plate 10, 20 comprises two channel partial plates 11, arranged on each other in stacking direction 40, with a circumferentially extending frame 14, as illustrated in FIGS. 1 and 2. Stays 16 extending at a slant to the longitudinal axis L are arranged between two oppositely positioned sides of the respective frame 14, wherein the stays 16 of the partial plates 11 cross each other, when viewed in the stacking direction 40, as can be seen in FIGS. 4, 5, and 7. Openings are formed in two oppositely positioned sides of the respective frame 14 in order to pass rods 58 through the channel plates 10, 20 by means of which the channel plates 10, 20 in the plate stack 50 can be fixed on each other.

A first type of channel plates 10, as can be seen in FIG. 6, is closed at both sides by a respective semipermeable layer 30 arranged on an outer side 42 of the respective channel partial plate 11. In this context, the stays 16 are arranged at the inner side 44 of the respective channel partial plate 11.

The respective channel partial plate 11 comprises a receiving surface 18 for the semipermeable layer 30.

The first group of flow channels 54 is arranged between the outer sides 42 of the semipermeable layers 30 of channel plates 10 sequentially following each other in stacking direction 40 and the second group of flow channels 52 is arranged in the interior 44 of the at least one channel plate 10, 20 between the semipermeable layers 30 at both sides and delimited by the semipermeable layers 30 in stacking direction 40.

In stacking direction 40, a flow channel 52 of one group follows alternatingly the flow channel 54 of the other group. One of the groups of flow channels 54 extends in this context along the longitudinal axis L positioned perpendicularly to the stacking direction 40.

The two groups of flow channels 52, 54 extend transversely to each other. In particular the flow channel 54 between the outer sides 42 of the channel plates 10, sequentially following each other in the stacking direction 40, with semipermeable layers 30 can be formed significantly narrower transverse to the longitudinal axis L, for example, at most half as wide, than a width along the longitudinal axis L of the flow channel 52, with the greatest width of the flow channels 52 in the interior 44 of the channel plate 10 between its semipermeable layers 30 at both sides. In an alternative embodiment, a single flow channel 54 can be formed, respectively, between the outer sides 42 of channel plates 10 sequentially following each other in stacking direction 40.

The sequentially stacked channel plates 10 are connected fluid-tightly to each other with the exception of the inflow or outflow regions 46L, 46Q, 48L, 48Q. In particular, the channel plates 10 are welded together or glued at the frames 14 of the channel partial plates 11, for example.

In an alternative embodiment, a second type of channel plates 20 can be embodied free of semipermeable layers 30. Such an alternative channel plate 20 is similar to a channel plate as in FIGS. 2 and 4. With it, plate stacks 50 can be formed in that, in stacking direction 40, channel plates 10 of the first type are arranged alternatingly with channel plates 20 of the second type, namely in that a channel plate 10 with semipermeable layers 30 and a channel plate 20 without semipermeable layers 30 are stacked on each other alternatingly, respectively. In this way, in addition to the flow channels 52 of the first group which are provided with ribs by the stays 16, flow channels 54 of the second group can also be advantageously formed which also comprise a rib structure with stays 16 which contribute to additional swirling and increased turbulence generation of the flowing fluid.

Figure 17:
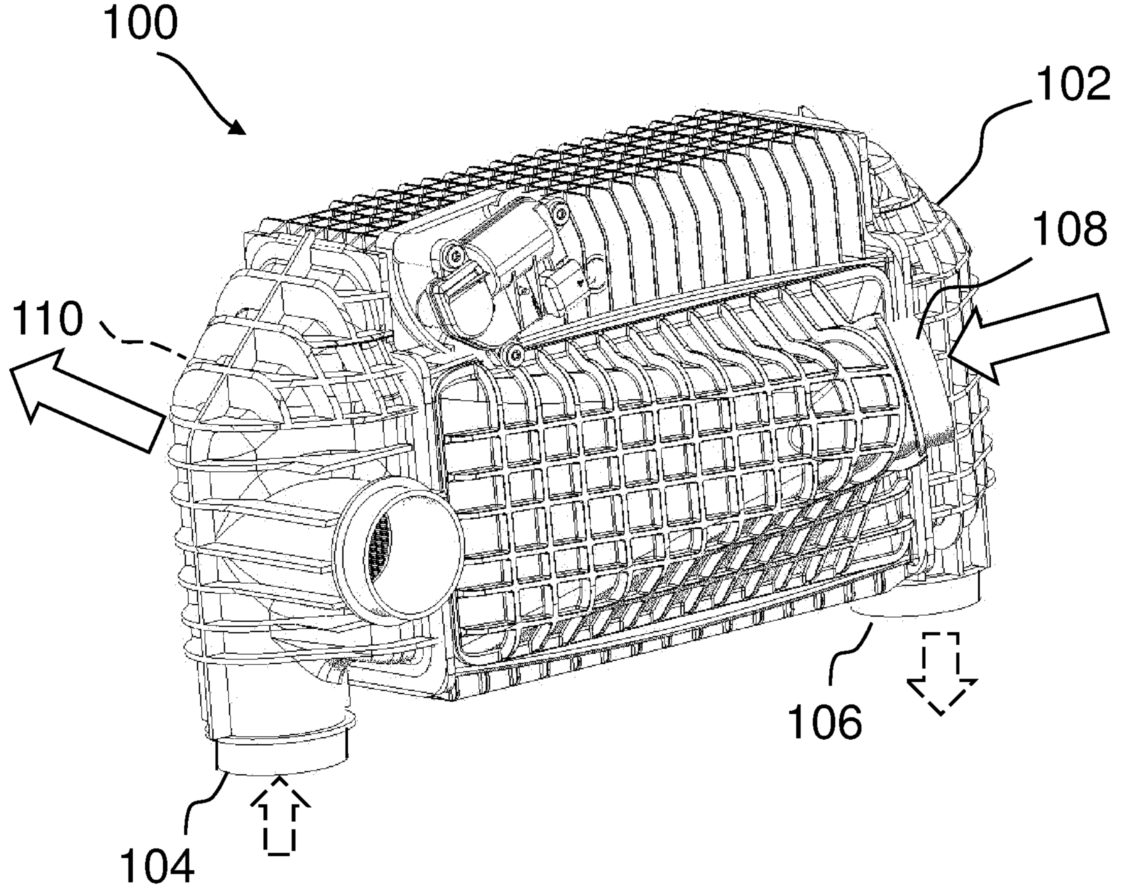
FIG. 17 shows a humidifying device according to an embodiment of the invention in isometric illustration.

FIG. 17 shows a humidifying device 100 according to an embodiment of the invention in isometric illustration.

In FIG. 17, an exterior view of the humidifying device 100 is illustrated. The humidifying device 100 comprises the housing 102 with an inlet 104 and an outlet 106 for a first fluid, for example, exhaust gas of fuel cells, and an inlet 108 and an outlet 110 for a second fluid, for example, fresh gas, in particular air, as reaction medium for fuel cells. In the humidifying device 100, a moisture transfer from the first fluid to the second fluid takes place.

In the housing 102, a cuboid plate stack 50, as illustrated in FIG. 16, is arranged in which channel partial plates 11 or channel plates 10 sequentially follow each other in a stacking direction 40. The plate stack 50 is sealed at its end faces by a circumferentially extending seal 68 against the housing 102.

The first fluid, for example, moist exhaust gas, in particular of a fuel cell, passes through the inlet 104, arranged at the bottom at the housing 102 in FIG. 17, into the housing 102 and flows through flow channels 52 through the plate stack 50, in FIG. 16 from the front into the drawing plane, and releases moisture. The flow channels 52 extend from the outer side of the plate stack 50 near the inlet 104 into the plate stack 50 and exit from the housing 102 through the outlet 106 arranged at the bottom at the housing 102 in FIG. 17.

The second fluid, for example, fresh gas, in particular dry air, in particular for a fuel cell, passes through the inlet 108, arranged laterally at the front at the housing in FIG. 17, into the housing 102 and flows through flow channels 54 through the plate stack 50, in FIG. 16 from left to right, and absorbs moisture. The flow channels 54 extend from the outer side of the plate stack 50 near the inlet 108 into the plate stack 50 and exit from the housing 102 through the outlet 110 arranged in FIG. 17 to the rear at the housing 102.

The two groups of flow channels 52, 54 are provided in a cross-flow arrangement, i.e., the directions of the flow channels 52, 54 are arranged at a slant or perpendicularly to each other.

The invention claimed is:

1. A humidifying device comprising:

a plate stack comprising channel plates sequentially following each other in a stacking direction in the plate stack, the channel plates each comprising a longitudinal axis perpendicular to the stacking direction, wherein one or more of the channel plates comprising a first channel partial plate and a second channel partial plate that are arranged on each other in the stacking direction, wherein each of the first channel partial plate and the second channel partial plate comprises a circumferentially extending frame and stays arranged between two opposite sides of the circumferentially extending frame, the stays extending at a slant to the longitudinal axis, and the stays of the first channel partial plate and the stays of the second channel partial plate cross each other when viewed in the stacking direction, wherein the plate stack further comprises semipermeable layers separating at least a first group of flow channels and a second group of flow channels from each other in the plate stack, wherein flow channels of the first group of flow channels alternate with flow channels of the second group of flow channels in the stacking direction, and wherein the first group of flow channels or the second group of flow channels extends along the longitudinal axis.

2. The humidifying device according to claim 1, wherein the first channel partial plate and the second channel partial plate are identical and stacked on each other such that the second channel partial plate is rotated by 180° along the longitudinal axis relative to the first channel partial plate.

3. The humidifying device according to claim 1, wherein each of the first channel partial plate and second channel partial plate comprises at least two regions in a plate plane, wherein the stays of the first channel partial plate are arranged m irror-symmetrically to each other in the at least two regions, respectively, and wherein the stays of the second channel partial plate are arranged mirror-symmetrically to each other in the at least two regions, respectively.

4. The humidifying device according to claim 1, wherein the channel plates comprise channel plates of a first type each comprising a first side closed by a first one of the semipermeable layers, and a second side closed by a second one of the semipermeable layers, the first one of the semipermeable layers forming an outer side of the first channel partial plate, and the second one of the semipermeable layers forming an outer side of the second channel partial plate, and wherein the stays are arranged in an interior of the channel plates of the first type between the first one of the semipermeable layers and the second one of the semipermeable layers.

5. The humidifying device according to claim 4, wherein the channel plates comprise channel plates of a second type without semipermeable layers.

6. The humidifying device according to claim 5, wherein the channel plates of the first type are arranged to alternate with the channel plates of the second type in the stacking direction.

7. The humidifying device according to claim 1, wherein the stays comprise, at least in sections, an L-shaped cross section or a U-shaped cross section, wherein a respective one of the stays comprising the L-shaped cross section comprises an angled leg projecting into an adjoining one of the flow channels, and wherein a respective one of the stays comprising the U-shaped cross section comprises two angled legs being oppositely positioned at the respective one of the stays and projecting into an adjoining one of the flow channels.

8. The humidifying device according to claim 1, wherein at least one of the stays of the first channel partial plate or the second channel partial plate comprises, at least in sections, an L-shaped cross section and, at least in sections, a U-shaped cross section.

9. The humidifying device according to claim 1, wherein the first channel partial plate is a fresh gas plate, wherein the second channel partial plate is an exhaust gas plate, and wherein the stays of the fresh gas plate and the stays of the exhaust gas plate comprise different cross sections at least in sections.

10. The humidifying device according to claim 9, wherein the stays of the fresh gas plate comprise, at least in sections, an L-shaped cross section comprising an angled leg projecting into an adjoining one of the flow channels.

11. The humidifying device according to claim 10, wherein the stays of the exhaust gas plate comprise, at least in sections, a U-shaped cross section comprising two angled legs being oppositely positioned at the stays and projecting into an adjoining one of the flow channels.

12. The humidifying device according to claim 9, wherein the stays of the exhaust gas plate comprise, at least in sections, a U-shaped cross section comprising two angled legs being oppositely positioned at the stays and project into an adjoining one of the flow channels.

13. The humidifying device according to claim 1, wherein a first one of the semipermeable layers and a second one of the semipermeable layers are arranged at opposite sides of the channel plates, respectively, wherein the flow channels of the first group of flow channels each are arranged between outer sides of two of the channel plates sequentially following each other in the stacking direction, and wherein the flow channels of the second group of flow channels each are arranged in an interior of the channel plates, respectively, the interior being delimited in the stacking direction by the first one and the second one of the semipermeable layers.

14. The humidifying device according to claim 13, wherein each of the first channel partial plate and the second channel partial plate comprises a receiving surface for the first one and the second one of the semipermeable layers, wherein the receiving surface comprises two opposite sides each comprising a rim section, wherein the rim section is higher than the receiving surface having a respective one of the semipermeable layers arranged thereon.

15. The humidifying device according to claim 13, wherein the first group of flow channels and the second group of flow channels extend at a slant or transversely to each other.

16. The humidifying device according to claim 15, wherein the flow channels of the first group of flow channels between the opposite sides of the channel plates are significantly narrower transverse to the longitudinal axis than a width along the longitudinal axis of the flow channels of the second group of flow channels, with the greatest width of the flow channels being provided in the interior of the channel plates between the semipermeable layers at both sides.

17. The humidifying device according to claim 16, wherein a single flow channel is formed, respectively, between the outer sides of the two of the channel plates sequentially following each other in the stacking direction.

18. The humidifying device according to claim 1, wherein the channel plates are connected fluid-tightly to each other except at inflow regions or outflow regions.

19. The humidifying device according to claim 18, wherein the channel plates are connected to each other at the circumferentially extending frame of the each of the first channel partial plate and the second channel partial plate, and are welded to each other or glued to each other.

20. A channel plate for use in a humidifying device, the channel plate comprising:

a first channel partial plate; and a second channel partial plate, wherein each of the first channel partial plate and the second channel partial plate comprises a circumferentially extending frame and stays arranged between two opposite sides of the circumferentially extending frame, the stays extending at a slant to a longitudinal axis of a respective one of the first channel partial plate and the second channel partial plate, wherein the first channel partial plate and the second channel partial plate are arranged on each other in a stacking direction, and wherein the stays of the first channel partial plate cross the stays of the second channel partial plate when viewed in the stacking direction.

* * * * *